(12) United States Patent
Ullmann et al.

(10) Patent No.: US 11,252,285 B1
(45) Date of Patent: Feb. 15, 2022

(54) SYSTEM IMPLEMENTING NON-CONTACT INTERACTION WITH PUBLICLY SHARED MACHINES

(71) Applicant: Xerox Corporation, Norwalk, CT (US)

(72) Inventors: Noah J. D. Ullmann, Rochester, NY (US); Jeremy H. L. Griffith, Rochester, NY (US); John F. Whiting, Webster, NY (US); Rajana M. Panchani, London (GB); Peter Granby, Hertfordshire (GB); Michael D. McGrath, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/313,080

(22) Filed: May 6, 2021

(51) Int. Cl.
*H04N 1/00* (2006.01)

(52) U.S. Cl.
CPC ..... *H04N 1/00355* (2013.01); *H04N 1/00395* (2013.01); *H04N 1/00413* (2013.01); *H04N 2201/0094* (2013.01)

(58) Field of Classification Search
CPC .......... H04N 1/00355; H04N 1/00395; H04N 1/00413; H04N 2201/0094
USPC ...................................................... 358/1.15
See application file for complete search history.

(56) References Cited

U.S. PATENT DOCUMENTS

| | | |
|---|---|---|
| 5,537,626 A | 7/1996 | Kraslavsky et al. |
| 5,882,002 A | 3/1999 | Kamei et al. |
| 8,095,110 B2 | 1/2012 | Lapstun et al. |
| 8,291,029 B2 | 10/2012 | Asthana et al. |
| 8,443,060 B2 | 5/2013 | Kemp et al. |
| 9,519,445 B2 * | 12/2016 | Panda .................... G06F 3/1292 |
| 10,427,433 B2 | 10/2019 | Lamontagne et al. |
| 2010/0321706 A1 | 12/2010 | Mori |
| 2012/0138679 A1 * | 6/2012 | Doyle .............. G06K 19/06037 235/380 |

(Continued)

OTHER PUBLICATIONS

Brother, "Printing by Directly Sending Commands", https://support.brother.com/g/s/es/dev/en/print/command/index.html?c=eu ot&lang=en&navi=offall&comple=on&redirect=on, Accessed on Feb. 3, 2021, pp. 1-3.

(Continued)

*Primary Examiner* — Neil R Mclean
(74) *Attorney, Agent, or Firm* — Gibb & Riley, LLC

(57) ABSTRACT

A menu of processing options of a publicly shared machine is presented on a user interface of a remote computerized device using an application (app). The publicly shared machine can include a printing component, a scanning component, a non-contact user identification component, etc. The app creates a job from options selected from the menu. The job is transmitted from the app to the publicly shared machine. The publicly shared machine notifies the app of availability to perform the job. In turn, the app provides a notice on the user interface of the remote computerized device that the publicly shared machine is available to perform the job. These methods further identify the user present at the publicly shared machine using the non-contact user identification component, allowing the publicly shared machine to perform the job based on the non-contact user identification, without requiring additional user interaction with the publicly shared machine.

20 Claims, 7 Drawing Sheets

(56) References Cited

U.S. PATENT DOCUMENTS

2014/0054369 A1* 2/2014 Liberty ................ G06Q 20/202
235/379
2015/0088674 A1 3/2015 Flurscheim et al.

OTHER PUBLICATIONS

"Zebra Setup Utilties: Sending Printer Commands and Receiving Data", https://supportcommunity.zebra.com/s/article/Zebra-Setup-Utilities-Sending-Printer-Commands-and-Receiving-Data?language=en_US, Accessed on Feb. 3, 2021, pp. 1-3.

* cited by examiner

SYSTEM IMPLEMENTING NON-CONTACT INTERACTION WITH PUBLICLY SHARED MACHINES

BACKGROUND

Systems and methods herein generally relate to components used with publicly shared machines, such as printing machines, and more particularly to systems implementing non-contact interaction with such publicly shared machines.

People are increasingly concerned about their health and safety and it is increasingly common for individuals to strive to minimize physical contact with shared surfaces such as with the user interface of publicly shared machines. These devices may not have been initially designed for this shift in behavior and may not be easily capable of adequately responding to newer health and safety trends.

In one non-limiting example where the publicly share machine is a printing machine (such as a multi-function printer (MFP) or multi-function device (MFD)) users commonly manually touch the publicly shared printing component's local user interface (LUI) to program certain jobs like copy jobs, fax jobs, and scanning jobs. Some publicly shared machines offer a voice instruction/recognition feature to reduce physical interaction with users; however, such voice-based features require specialized components, can be cumbersome and awkward to use, can have difficulty providing the same interaction as touch-based user interfaces, can be limited in the languages they support, and may be noisy and not suitable for office use.

SUMMARY

Systems herein generally can include a publicly shared machine connected to a computerized network. The publicly shared machine can be, for example, a multi-function device that includes (among other components) a printing component, a scanning component, a non-contact user identification component, etc. Further, with systems herein an application (app) operates through or on a remote computerized device that is also connected to the computerized network and is separate from the publicly shared machine. The app is, therefore, in communication with the publicly shared machine through the computerized network.

The app is adapted to provide a menu of processing options of the publicly shared machine to a user on a user interface of the remote computerized device, to create a job from the options selected from the menu, and to transmit the job created to the publicly shared machine through the computerized network. The non-contact user identification component is adapted to identify the user.

The publicly shared machine is then adapted to automatically perform the job for the user based on the non-contact user identification component identifying the user and/or job. Specifically, the publicly shared machine automatically performs the job based just (only) on the non-contact user identification component identifying the user and/or job, without requiring additional user interaction with the publicly shared machine.

In various embodiments herein, the non-contact user identification component can actually be one or more of multiple different identification components (e.g., a wireless electronic reader, an optical code reader, a facial recognition device, a voice recognition device, etc.) each performing user identification in a different manner. In such situations, the menu includes options for choosing one or more of these multiple identification components and the app is adapted to add the one or more chosen identification components to the job. In these embodiments, the publicly shared machine is adapted to identify the user using just (only) the one or more chosen multiple identification components that are included in the job. In this way, the user can adjust the processing to the degree of physical contact (or complete lack thereof) to match the level of hygienic safety the user desires.

The scanning component can include a document-presence sensor, and the scanning component can be adapted to automatically begin scanning based only on the document-presence sensor detecting a document being present. Further, the non-contact user identification component can actually be the scanning component, and the scanning component is adapted to identify the user by scanning information (e.g., a scan-readable code) printed on a document.

In other embodiments, the system may only optionally include the non-contact user identification component(s). In such systems, the app is adapted to cause a scan-readable code containing the options selected in the job to be printed on a job identification sheet. In some examples, the remote computerized device can be operatively (directly or indirectly) connected to a remote printer that is separate from the publicly shared machine and the app is adapted to cause the remote printer to print the scan-readable code (e.g., the job) on a job identification sheet. In other examples, the app is adapted to cause the printing component of the publicly shared machine to print the scan-readable code on the job identification sheet. Therefore, the user can carry a printed job identification sheet containing the scan-readable code to the publicly shared machine, or the user can simply pick up the same printed job identification sheet from the publicly shared machine. The user then places the job identification sheet containing the scan-readable code on top of the stack of sheets to be scanned and drops the stack into the document handler (all potentially without making contact with the publicly shared machine).

In these embodiments the scanning component is actually the non-contact user identification component, and this scanning component is adapted to scan the job identification sheet and identify the options selected (from the scan-readable code (e.g., job) printed on the job identification sheet). The publicly shared machine is adapted to automatically perform the job based on the scanning component scanning the job identification sheet using the options selected as identified by the scanning component. Specifically, the publicly shared machine automatically performs the job based just (only) on the scanning component scanning the job identification sheet, without requiring additional user interaction with the publicly shared machine.

These embodiments can also use the non-contact user identification component where the non-contact user identification component is adapted to identify the user that is associated with the job, and the publicly shared machine is adapted to cause the printing component to print the scan-readable code on a job identification sheet based on the non-contact user identification component identifying the user.

Methods herein provide a menu of processing options of a publicly shared machine on a user interface of a remote computerized device using an application (app) operating through the remote computerized device. The publicly shared machine is connected to the remote computerized device through a computerized network. The app is therefore in communication with the publicly shared machine through the computerized network. The publicly shared machine can include a printing component, a scanning component, and a non-contact user identification component.

In these methods, the app creates a job from options selected from the menu. As noted above, the non-contact user identification component can actually be multiple identification components (e.g., a wireless electronic reader, an optical code reader, a facial recognition device, a voice recognition device, etc.) each performing user identification in a different manner. Therefore, the menu presented on the user interface can include options for choosing one or more of these multiple identification components. These methods can therefore further include the process of adding one or more of the chosen ones of the multiple identification components to the job using the app.

In such methods, the job is transmitted from the app to the publicly shared machine (through the computerized network). In these methods the publicly shared machine notifies the app (through the computerized network) that the publicly shared machine is available to perform the job. In turn, methods herein provide (using the app) a notice on the user interface of the remote computerized device that the publicly shared machine is available to perform the job. This allows the user to approach the publicly shared machine knowing that others will be physically distanced from the publicly shared machine because the publicly shared machine has been identified as being available.

These methods further identify the user arriving at, or present at, the publicly shared machine using the non-contact user identification component. The process of identifying the user can be performed using just (only) the one or more chosen ones of the multiple identification components included in the job by the publicly shared machine.

As noted above, the scanning component can include a document-presence sensor and with methods herein the scanner can automatically begin scanning using the scanning component based just (only) on the document-presence sensor detecting a document being present. Again, the job can simply be identified using the scanner by scanning a scan-readable code from a document and the automatic scanner starting further reduces the possibilities of user contact with potentially contaminated publicly shared machines.

This allows such methods to automatically perform the job using the publicly shared machine based on the non-contact user identification component identifying the user. Specifically, the publicly shared machine automatically performs the job based just (only) on the non-contact user identification component identifying the user, without requiring additional user interaction with the publicly shared machine. This minimizes or eliminates physical interaction of the user with the publicly shared machine.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
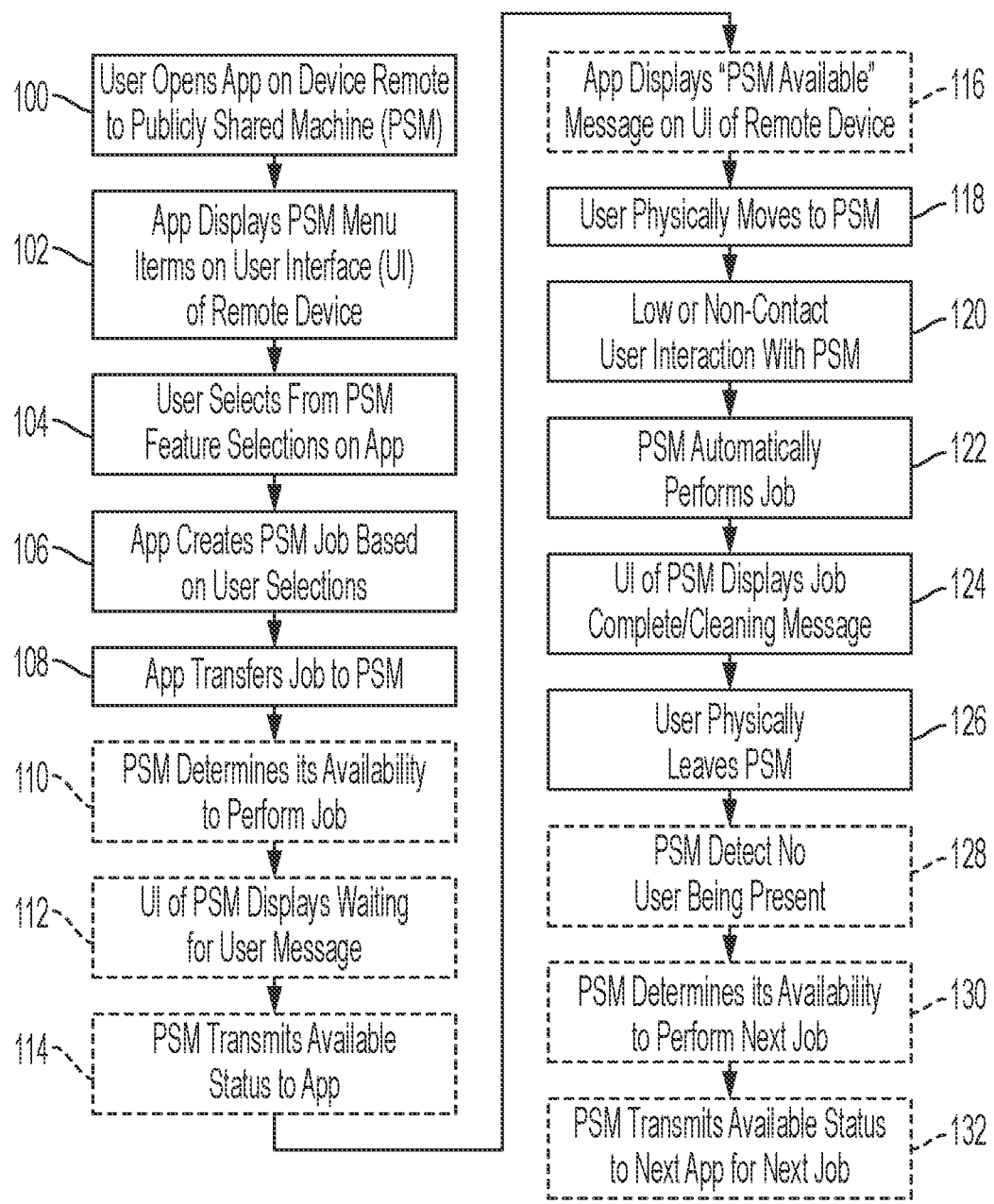
FIGS. 1 and 2 are flow diagrams of various methods herein.

As mentioned above, users increasingly desire to reduce unnecessary physical interaction with a shared machine. Further, voice-based features can require expensive components, can be awkward to use, inaccurate, language-limited, and noisy. Additionally, it is less expensive and easier to implement non-contact solutions that do not require additional components or modification of existing equipment.

In view of these and other issues, the systems and methods disclosed here leverage existing device sensors and components to add non-contact or touch-less processing that reduces or avoids physical interaction between the user and the publicly shared machine. Systems herein allow a user to adjust device settings to the degree of health and safety they prefer, and this is done remotely using a private device separate from the publicly shared machine. Also, this processing can automatically initiate scanning or other operations using existing sensors of the publicly shared machine to avoid physical interactions between the user and the publicly shared machine.

To promote contact-less interactions, systems herein provide an app operating through the local user interface of a user's individual device (private, non-shared computerized device) to set the processing options of the publicly shared printing machine (e.g., color vs. monochrome printing, duplex or simplex printing, email and/or server destinations of scans, etc.) locally so as to eliminate user interaction with the shared user interface of the publicly shared machine.

The systems herein allow the user to remotely set all processing options of the publicly shared machine to (using the examples of a copy job, scanning job, fax job, etc.) automatically begin scanning once a document is detected in the document handler, once the scanner is closed, etc. To reduce or eliminate physical interaction with the publicly shared machine, systems herein can provide notifications that inform the user of automatically initiated processing features of the publicly shared machine including, for example, how and where to load their original documents so as to avoid or minimize physical contact with the publicly shared machine.

With methods and systems herein, a user programs their entire job, including apps, features, etc., on their personal device (e.g., desktop client, notebook, tablet, smartphone, etc) and then transfers the completely prepared job to the publicly shared machine. The user's personal device is sometimes referred to herein as a "remote computerized device" because it is physically remote from the publicly shared machine (e.g., is some distance from the publicly shared machine and is not physically connected to the publicly shared machine). For example, the remote computerized device may be in a different room, different building, different town, etc., from the publicly shared machine when the remote computerized device is used to program the job that the publicly shared machine will perform.

The remote computerized device can transfer the job to the publicly shared machine in a number of ways. In one example, the job (containing the user-identified feature selections of the publicly shared machine) can be transferred electronically through a computerized network. In this situation, after the remote computerized device transfers the job to the publicly shared machine, the user then arrives at the publicly shared machine. The user can be identified/authenticated by the publicly shared machine in a non-contact manner, such as using a radio frequency identification (RFID) employee badge, using a smart phone (or other electronic device) to communicate wirelessly with the publicly shared machine, using a scan-readable code present on a screen of the user's smart phone, etc. In other situations, the publicly shared machine can simply be reserved for a specific user and processing begins immediately upon the user placing documents into a document handler or a user being detected in proximity of the publicly shared machine, without the user being identified/authenticated.

In another example, the remote computerized device translates the user's instructions into a scan-readable code sheet, potentially stored as a portable document format (PDF). In some alternatives herein, the scan-readable code can include all feature selections (menu selections) and in other alternatives the scan-readable code can simply identify a previously electronically transferred job that the publicly shared machine has previously received and stored. The user can print the job instruction sheet locally using their remote computerized device or the job instruction sheet can be printed by the publicly shared machine and the user can retrieve the printed job instruction sheet when they arrive at the publicly shared machine. In some examples, the scan-readable code can be formatted as bar code, quick-reference (QR) code, or formatted text which can be read using optical character recognition (OCR), etc. In additional examples, the scan-readable code can be formatted so that it can be read only by licensed readers.

Walking through one example with the printed job instruction sheet printed at the publicly shared printing machine, the user can pick up the printed job instruction sheet from an output tray of the publicly shared machine that requires no or limited touch, such as an offset catch tray (OCT), a top tray, or a simple output tray. The user then places the job instruction sheet on top of their stack of originals. The user then inserts the job instruction sheet, together with their originals into the document handler of the publicly shared machine for the device to scan. The publicly shared machine automatically starts to feed the originals without the user needing to press any buttons. In some examples, the publicly shared machine counts down a set number of seconds (shown on the user interface of the publicly shared machine) and then starts to feed the originals, unless the user halts the countdown.

The publicly shared machine reads and interprets the scan-readable code printed on the instructions sheet to identify the features of the publicly shared machine that the end user has requested through their previous menu selections. The publicly shared machine then executes the job (copy job, fax send job, scan to job, etc.). After the publicly shared machine has completed all processing, the user then retrieves their original set with the job instruction sheet from the document handler output area (which is a tray that requires no touch). As shown in this example, the user walks away from the publicly shared machine having successfully completed their job without ever touching the publicly shared machine's user interface or any other part of the publicly shared machine.

The user may save the printed job instruction sheets for future jobs. For jobs that are performed often or have a regular frequency of weekly/monthly cadence, a user could keep a personal folder of printed job instruction sheets for their use. This would therefore cut down the number of times they are required to print job instruction sheets for copy, fax, and scan to jobs that they perform regularly. Also, in some options, the printed job instruction sheet can work independently of any authentication system the customer may already have, or authentication can occur via the job instruction sheet.

Once scanning, copying, etc., is complete, other notifications can be presented by systems herein to remind users of any session ending activities (e.g., remove originals or a reminder to wipe down surfaces, etc.). All such notifications can be automatically dismissed after a specified duration. Touch-less activities can also be controlled/encouraged according to various settings, e.g., forcing touch-less options for all scan jobs, mandating touch-less options based on permissions, etc.

Such touch-less settings that reduce physical touch (increase health and safety) can include, for example, settings that hold client-initiated scan jobs until the user has been identified by the publicly shared machine, settings that use automated procedures to reduce the need to manually interact with the control panel, settings that use notifications to give contextual feedback at key points in the process. Such settings minimize the number of times the user needs to physically interact with the publicly shared machine.

Thus, systems herein allow all processing of client-initiated scan jobs to be completed at the shared machine during a single user visit to avoid multiple user trips to and from the publicly shared machine per job. As shown above, rather than a user typing a fax number in, or even searching a frequently used number or friendly name on the shared user interface of the publicly shared machine, with systems and methods herein the user merely prints a job instruction sheet with the job details encoded in the scan-readable code, and this scan-readable code tells the publicly shared machine to perform functions when the job instruction sheet is scanned as the first sheet of a stack of originals placed into the document handler of the publicly shared machine.

As with any workflows there are potentially conditions that will have to be addressed when things go wrong. For example, the user may have produced a printed job instruction sheet which is improperly set up. In these cases, the user interface of the publicly shared machine informs the user on the shared user interface of the publicly shared machine of the error and then deletes the job. This message can stop being displayed after a timer counts down to eliminate the need for the user to press an item to clear the error message, which avoids user contact with the shared user interface. The user can return to their remote computerized device and make the necessary corrections to the printed job instruction sheet.

As noted above, evolving health and safety concerns worldwide affect all businesses and their everyday deliverables as well as customers not wishing to expose themselves to the publicly shared user interfaces of publicly used devices in stores, post offices, kiosks, etc. By identifying ways to enhance the user experience, the systems and methods disclosed herein deliver solutions where not only does the user not touch the device very often but also feel much safer when having to do so.

Scanning and printing remain important aspects of the workplace, whether that be in a traditional office or a remote work location, and the need to use shared machines for performing such activity will remain, and the systems and methods herein increase health and safety for such shared machines. The systems and methods disclosed herein are beneficial to many types of user groups including the traditional office environment, the medical sector where control of environments and possible higher risk of spread of infection is a concern, high production environments where the volume of walk-up user jobs is high and where users touch shared user interfaces multiple times, home office/retail stores where an end user may print their job instruction sheet at home and visit a retail office store to carry out their workflow/job request.

An additional aspect that systems and methods disclosed herein provide is that no hardware modifications are needed to existing publicly shared machines. This is useful because hardware modifications tend to be very costly. Existing user recognition equipment (e.g., wireless readers, optical readers, etc.) can be used to recognize and authenticate the user and reduce the number of physical touches of the shared user interface. Additionally, authentication can be accomplished using the printed job instruction sheet, also reducing the need to touch pin-pads and/or user interface screens to log in.

FIG. 1 is flowchart illustrating exemplary methods herein. In item 100, a user initiates a process on their local "remote" device (e.g., opens a software application (app) on their personal computer (PC) or smartphone, etc.). As described above, the user's personal device (e.g., desktop client, notebook, tablet, smartphone, etc) is sometimes referred to herein as a "remote computerized device" because it is physically remote from the publicly shared machine (e.g., is some distance from the publicly shared machine and is not physically connected to the publicly shared machine). Additionally, the publicly shared machine (PSM) can be, in one example, a multi-function printer (MFP) and the PSM abbreviation is used in the drawings to identify the publicly shared machine without limiting the publicly shared machine to an MFP.

Item 102 in FIG. 1 shows that the methods herein provide a menu of processing options and feature selections of the publicly shared machine on the user interface of the remote computerized device using the app that is operating through the remote computerized device. The publicly shared machine is connected to the remote computerized device through a computerized network. In one example, the feature selection information can be delivered to the MFP on a sheet of paper with a printed code on it and, in such situations, the MFD does not necessarily have to connect to a network. The app is therefore in communication with the publicly shared machine through the computerized network. The publicly shared machine can include a printing component, a scanning component, and a non-contact user identification component.

Figure 3:
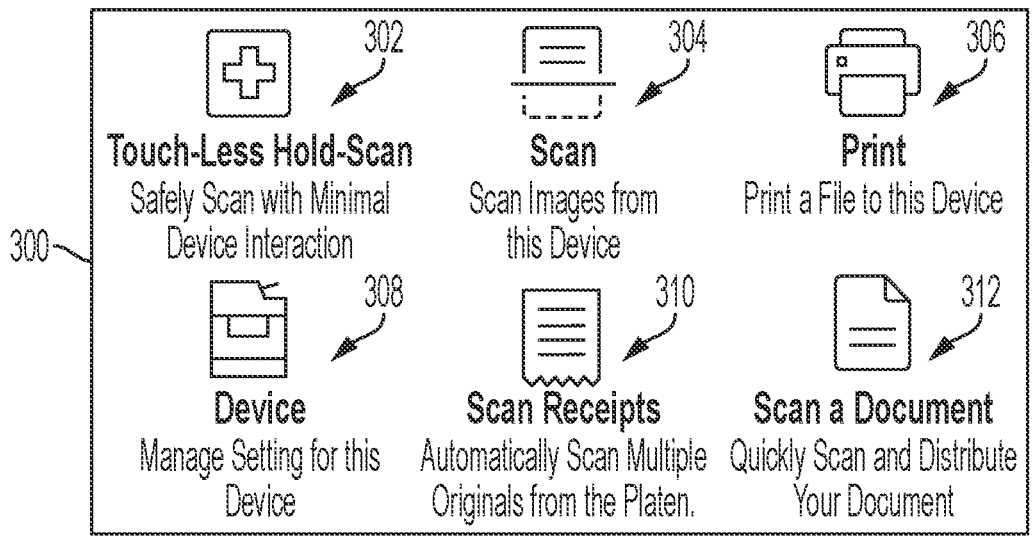
FIGS. 3 and 4 are schematic diagrams illustrating exemplary menus that can be presented by the systems and methods herein.
Figure 4:
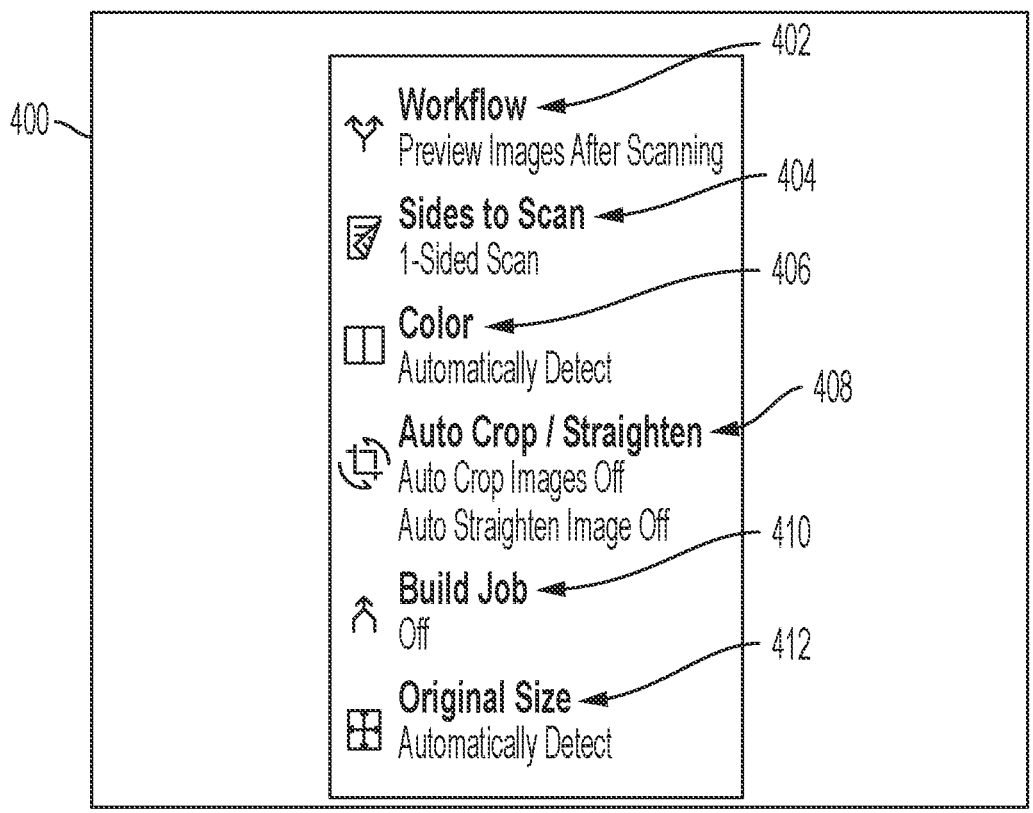

The user interacts with the app using the user interface of their remote computerized device to select from menu choices and thereby select different features of the publicly shared machine that are available to perform processing in item 104. For example, the user may want to create a PDF from a printed document and have that PDF be stored in a network server. In item 104, the user would select a scan-to-PDF menu option from the menu presented by the app on the user interface of the remote computerized device and then select further menu options through the app that identify the network location where the PDF is to be stored. FIGS. 3 and 4, discussed below, show some exemplary menus the app displays on the user interface of the remote computerized device.

As shown in item 106, the app then creates what is referred to herein as a "job" based on the features/options the user selected from the menu(s) in item 104. In one aspect, the job can be as simple as a listing of menu options selected by the user. Additionally, the job can include identification/authentication information for the user, identification of the remote computerized device, identification of the publicly shared machine, etc. Specifically, in item 104 the user can enter their personal identification number (PIN) or other user authentication information into the app through the remote computerized device and such can be included as part of the job and this allows the publicly shared machine to interact with an authentication server to authenticate the user when it receives the job. In a different embodiment, the app can optionally contact authentication servers/gateways to perform the user authentication and the app can store a flag indicating that the user has been validated/authenticated in the job also, eliminating the need for the publicly shared machine to perform the user authentication.

Once the job is fully created, the app transfers the job to the publicly shared machine, as shown in item 108. For example, in item 108 the app can electronically transmit the job from the remote computerized device to the publicly shared machine through the computerized network directly. In other options, the app can transmit (send) the job to a queue or queue manager that assigns the job to an appropriate publicly shared machine.

In item 110 the publicly shared machine optionally (noted by the broken line box of item 110) determines whether it is available to perform the job. The publicly shared machine performs this determination by evaluating whether it is in an idle state or whether it is actively performing a different job. Additionally, if the publicly shared machine includes existing proximity sensors (which are included in some publicly shared machines to wake the publicly shared machine from a sleep state as users approach, and for other reasons) the publicly shared machine can use such existing proximity sensors to determine whether individuals are physically present within a previously determined range (e.g., feet, yards, meters, etc.). Therefore, in item 110, the publicly shared machine (potentially controlled using instructions issued by the app) self-determines whether it is available to perform the job and potentially determines whether users are within a physical proximity of the publicly shared machine (for example, using existing proximity sensors).

Once the publicly shared machine determines that it is available to perform the job, the publicly shared machine can optionally display a message on its screen (the user interface screen of the publicly shared machine) that the publicly shared machine is waiting for the user who created the job (e.g., "Waiting for Daisy to place documents in document handler") as shown in item 112. This message can identify the user by name or can merely identify the job number, depending upon the user-selected privacy settings in the app.

In this way the publicly shared machine can be considered to be "reserved" for the user. Further, this "waiting for user" message displayed on the user interface of the publicly shared machine helps other users know that the publicly shared machine is reserved for someone else and helps the user know that they are at the correct publicly shared machine when they arrive. The processing in item 112 can be performed by the publicly shared machine itself or can be performed according to instruction issued by the app to the publicly shared machine.

Continuing with such optional processing, after the publicly shared machine determines that it is available in item 110, in item 114 the publicly shared machine transmits its availability status to the app through the computerized network. This allows the app to display an "availability" message on the user interface of the remote computerized device, as shown in item 116.

The message that the publicly shared machine is available (from item 116) allows the user to know that they can approach the publicly shared machine without encountering a line at the publicly shared machine and potentially that they will have the space around the publicly shared machine available to themselves without other users being present. This allows the user more confidence that they will encounter fewer people or potentially no people when they interact with the publicly shared machine. In response, as shown in item 118, the user can feel safer moving to the publicly shared machine.

Again, the processing shown in items 112-116 is optional and the availability of such optional processing may depend upon the existing sensors that are available on the publicly shared machine. Further, such optional processing varies greatly from environment to environment. For example, in the small office environment, where all users share a single publicly shared machine and where all users are only steps from the publicly shared machine, reserving the publicly shared machine for a single user can be quite convenient and non-disruptive to their workflow.

In another example, users may be much more remote to the publicly shared machine, where users may create the job at home or in one office building and travel to the publicly shared machine, which may be located at a retail store, in a different building, etc. In these situations, the app can inform the publicly shared machine when the user is in closer proximity to the publicly shared machine, essentially delaying the reservation of the publicly shared machine until the user is close enough to the publicly shared machine to begin the processing within a shorter time frame. This prevents publicly shared machines from being reserved for extended periods while users travel long distances to arrive at the publicly shared machine.

Once the user finishes moving (physically traveling) to the publicly shared machine in item 118, the user interacts with the publicly shared machine through what is referred to herein as a "non-contact user identification" of the publicly shared machine in item 120. Thus, in item 120, these methods can, in some embodiments, automatically identify the user arriving at, or present at, the publicly shared machine using the non-contact user identification component of the publicly shared machine.

In one example, in item 120 the publicly shared machine can be configured to use (or the app can control the publicly shared machine to use) existing sensors of the publicly shared machine to form the non-contact interface through which the user can interact with the publicly shared machine without making physical contact with the publicly shared machine.

These non-contact user identification components can be one or more existing components of the share publicly shared machine including, but not limited to, a wireless electronic reader (e.g., RFID or NFC device), an optical code reader (e.g., a dedicated optical code reader device or the platen of the optical scanner of the publicly shared machine), a facial recognition device (e.g., a camera), a voice recognition device (e.g., a microphone), etc., each performing user identification in a different manner. Different publicly shared machines will have different existing components and the systems and methods herein leverage whatever existing components the share publicly shared machine currently includes as the non-contact interface.

The menu presented on the user interface in item 102 can include options for choosing one or more of these multiple identification components currently existing as a component of the publicly shared machine. These methods can therefore further include the process of adding and one or more of the chosen ones of the multiple identification components to the job using the app. The later process of identifying the user in item 120 can be performed using just (only) the user-chosen ones of the multiple identification components included in the job. This allows users that prefer, for example, to avoid facial recognition systems (if the publicly shared machine has such capabilities) and can require a publicly shared machine to only identify the presence of the user based upon a valid employee badge or the presence of the user's smartphone. Many other user-identification settings can accommodate other user privacy preferences of different users.

Most document handlers/scanners include an existing document-presence sensor. Therefore, in some embodiments herein (especially embodiments that reserve the publicly shared machine for a specific user) the user is not necessarily identified and the only low or non-contact user interaction with the publicly shared machine (item 120) is the depositing of a stack of sheets (one or more sheets) in the document handler. Therefore, in such embodiments, when the user arrives at the publicly shared machine (item 118) the user visually confirms that the publicly shared machine is reserved for them by reading the "waiting for user" message on the user interface of the publicly shared machine (provided by the processing in item 112) and the user merely places the original sheets to be scanned into the document handler, without making contact with the document handler, at which point the document-presence sensor of the document handler recognizes that sheets have been placed in the document handler.

Item 122 shows that, with the processing herein, the publicly shared machine is adapted to (or is controlled by the app to) automatically performs the job without requiring any additional interaction or physical contact with the user. In some embodiments, in item 122 the methods herein can automatically begin scanning using the scanning component of the publicly shared machine based just (only) on the document-presence sensor detecting a document being present. In other embodiments, such as a print job, as soon as the user is identified in item 120 the printing commences immediately and the print job is output to a location from which the user may retrieve the print job without making physical contact with the publicly shared machine.

In other embodiments, the methods may first require that the user be identified and/or authenticated in item 120 before the automatic processing in item 122 can begin. Therefore, in addition to the user being identified using existing sensors as described in item 120 above (e.g., a wireless electronic reader, an optical code reader, a facial recognition device, a voice recognition device, etc.), the user may also be requested to provide authorization information in item 120. Therefore, in such embodiments the user interface of the publicly shared machine can presents messages instructing the user to present an employee badge or other item that contains authorization information that can be read by an RFID or NFC reader of the publicly shared machine. In other options, the user interface of the publicly shared machine and/or the app operating on the user's smartphone may be adapted to (or controlled by the app to) present messages instructing the user to enter their PIN into their smartphone. All such user identification/authentication 120 is performed without requesting the user to physically interact with the shared user interface of the publicly shared machine, which reduces or eliminates the user's physical contact with the shared user interface of the publicly shared machine.

Any scanned or printed sheets from the publicly shared machine are output to locations that permit the user to retrieve the sheets without making physical contact with the publicly shared machine, such as such as an OCT, a top tray, or a simple output tray. Such output trays commonly include existing sensors to detect whether sheets are present or whether the sheets have been removed. As shown in item 124 in FIG. 1, the shared user interface of the publicly shared machine can be adapted to (or controlled by the app to) display a message that the job has been completed and (if the sheets have not been removed from the appropriate trays, as determined by the sensors within those trays) display messages that the user needs to remove their sheets from the trays. In addition, the user interface of the publicly shared machine can display messages that any areas where the user has made physical contact need to be wiped down and cleaned prior to the next user's arrival. The user then walks away from the publicly shared machine (physically leaves the publicly shared machine) as shown in item 126 in FIG. 1.

Additional optional processing is shown in items 128-132 (again indicated in FIG. 1 using dashed line boxes). In item 128, the publicly shared machine determines whether any users are present within a specified physical distance range (e.g., feet, meters, etc.) using the existing proximity sensors of the publicly shared machine. This allows the publicly shared machine to determine its availability to perform the next job, as shown in item 130. Therefore, in item 130 the publicly shared machine determines whether the previous job has been completed, whether the previous user has removed all papers from all trays, and whether all individuals have vacated the specific physical proximity distance range around the publicly shared machine. Once the publicly shared machine determines that it is available to perform the next job, the publicly shared machine can transmit an available status to the next app that was used to create the next job that the publicly shared machine will perform in item 132.

This processing allows such methods to automatically perform the job using the publicly shared machine based on the non-contact user identification component(s) identifying the user. Specifically, the publicly shared machine automatically performs the job based just (only) on the non-contact user identification component identifying the user (or possibly just upon the document handler detecting sheets being placed into the document handler if the publicly shared machine is reserved for one user) without requiring additional user interaction with the publicly shared machine. This minimizes or eliminates physical interaction of the user with the publicly shared machine.

As noted previously, the job can simply be identified using the scanner of the document handler of the publicly shared machine by scanning the code from the job instruction sheet. The ability of the scanner to automatically scan upon sensing the presence of sheets assists in such processing further reduces the possibilities of user contact with potentially contaminated publicly shared machines.

Figure 2:
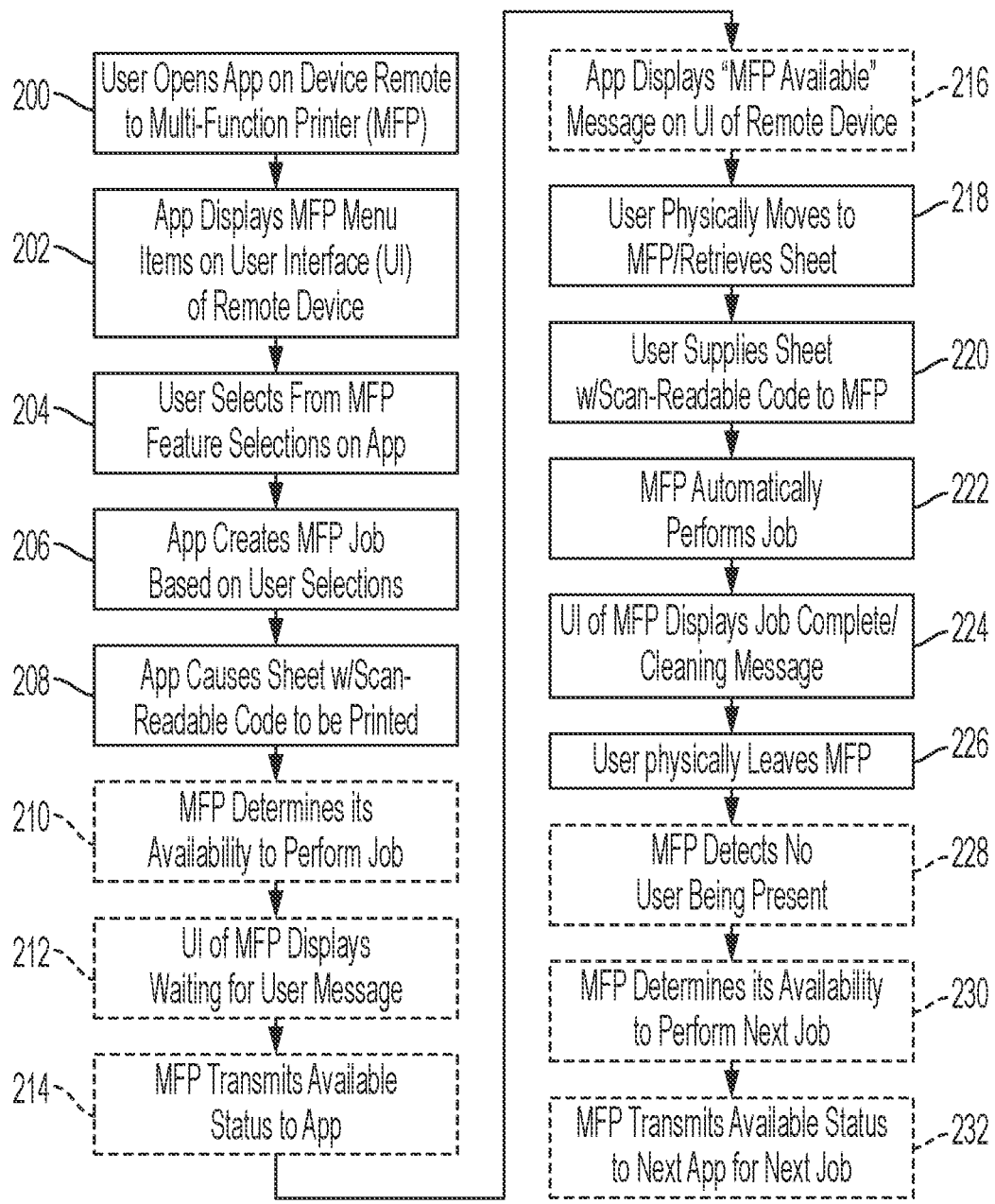

FIG. 2 is flowchart illustrating exemplary methods herein that operate MFPs as the publicly shared machine and use printed sheets with job codes thereon. The processing shown in FIG. 2 is substantially similar to the processing shown in FIG. 1, except with the processing shown in items 208 and 220. Therefore, the discussion of items 200-206, 210-218, and 222-232 below is limited and reference is made to discussion above the corresponding items 100-106, 110-118, and 122-132 in FIG. 1. for a more complete explanation.

Referring briefly to item 200 in FIG. 2 (which is discussed in greater detail above relating to item 100 in FIG. 1) a user opens the app on their remote computerized device. In item 202 in FIG. 2 (which is discussed in greater detail above relating to item 102 in FIG. 1) the methods herein provide a menu of processing options and feature selections of the MFP on the user interface of the remote computerized device using the app that is operating through the remote computerized device.

The user interacts with the app using the user interface of their remote computerized device to select from menu choices and thereby select different features of the MFP that are available to perform processing in item 204 (which is discussed in greater detail above relating to item 104 in FIG. 1). As shown in item 206 (which is discussed in greater detail above relating to item 106 in FIG. 1) the app then creates the job based on the options the user selected from the menu(s) in item 204.

In item 208, which is different from the processing shown in item 108 in FIG. 1, at least as part of the process of transferring the job to the MFP, the app causes an information sheet containing a scan-readable code to be printed. More specifically, in item 208, the app (operating through the remote computerized device) translates the user's instructions into a scan-readable code item such as a portable document format (PDF) file. In some examples, the scan-readable code can be formatted as bar code, quick-reference (QR) code, or formatted text which can be read using optical character recognition (OCR), etc. In additional examples, the scan-readable code can be formatted so that it can be read only by licensed readers. The scan-readable code can be printed on a sheet and/or displayed on a screen, such as the screen of the user interface of the user's smartphone (remote computerized device).

In some alternatives herein, the scan-readable code can include all user feature selections (user menu selections) and in other alternatives the scan-readable code can simply identify a previously electronically transferred job that the MFP has previously received and stored. Therefore, in a similar manner to that described in the processing of item 108 in FIG. 1 that is discussed above, in item 208 in FIG. 2, the app can similarly transfer the full job to the MFP and use the presence of the scan-readable code on a sheet or on the user's remote computerized device to simply identify the previously electronically transferred job.

In item 208, the user (through selections in the app) can cause the job instruction sheet containing the scan-readable code to print locally using a printer connected to their remote computerized device. Alternatively, the user (through selections in the app) can cause the job instruction sheet containing the scan-readable code to be printed by the MFP. The user can retrieve the printed job instruction sheet when they arrive at the MFP if the MFP is selected as the device to print the job instruction sheet.

In item 210 (which is discussed in greater detail above relating to item 110 in FIG. 1) the MFP as optionally (noted by the broken line box of item 210) controlled using instructions issued by the app, self-determines whether it is available to perform the job and potentially determines whether users are within a physical proximity of the MFP (using existing proximity sensors).

Once the MFP determines that it is available to perform the job, the MFP can optionally display a message on its screen (the user interface screen of the MFP) that the MFP is waiting for the user who created the job (e.g., "Waiting for Daisy to place documents in document handler" as shown in item 212 (which is discussed in greater detail above relating to item 112 in FIG. 1).

Continuing with such optional processing, after the MFP determines that it is available in item 210, in item 214

(which is discussed in greater detail above relating to item 114 in FIG. 1) the MFP transmits its availability status to the app through the computerized network. This allows the app to display an availability message on the user interface of the remote computerized device, as shown in item 216 (which is discussed in greater detail above relating to item 116 in FIG. 1). Again, the processing shown in items 212-216 is optional and the availability of such optional processing may depend upon the existing sensors that are available on the MFP.

In response, as shown in item 218 (which is discussed in greater detail above relating to item 118 in FIG. 1), the user moves to the MFP and retrieves the job instruction sheet either at the printer local to the remote computerized device or the print output tray of the MFP. In some embodiments, the app may not instruct the MFP to print the job instruction sheet (item 208) until the user arrives at the MFP (item 218) or is potentially authenticated at the MFP as discussed above in item 120, and these options can be user-selectable within the app.

Once the user finishes moving (physically traveling) to the MFP and has retrieved the job identification sheet from the appropriate printer in item 218, the user interacts with the MFP through what is referred to herein as a "non-contact user interface" of the MFP in item 220. In some embodiments, in item 220, these methods can, in some embodiments, automatically identify the user arriving at, or present at, the MFP using the non-contact user identification component of the MFP as discussed above in item 120. In other embodiments, the MFP identifies the job (and potentially identifies/authenticates the user) in a non-contact manner by automatically scanning the job identification sheet.

As noted above, most document handlers include an existing document-presence sensor. Therefore, in some embodiments herein in item 220 the user merely places the original sheets to be scanned into the document handler with the job identification sheet on the top of the stack of sheets (positions the job identification sheet to be the first sheet scanned by the MFP), without making contact with the document handler, at which point the document-presence sensor of the document handler recognizes that sheets have been placed in the document handler.

In other alternatives and depending upon user option selections within the app, the user may have selected to have the scan-readable code appear on the screen of their remote computerized device (on their smartphone, for example, using a PDF reader or word processor on their smartphone). In such cases, in item 220 the user supplies the scan-readable code to the MFP by placing their remote computerized device on the platen (or on a dedicated code reader, if available on the MFP) to have the screen of the remote computerized device scanned to allow the MFP to read the scan-readable code displayed on the remote computerized device.

If the scan-readable code provided to the MFP only identifies the job, the MFP is adapted to use the job identification within the scan-readable code to retrieve the job that was previously sent to the MFP by the remote computerized device (see processing described above for item 108 in FIG. 1). On the other hand, if the scan-readable code includes all aspects of the job, the scan-readable code alone provides the MFP all information needed to perform the full job (potentially including information needed to authenticate the user and/or a valid user flag for previously authenticated users, etc., as discussed above).

Item 222 shows that, with the processing herein, the MFP automatically performs the job without requiring any additional interaction or physical contact with the user. In some embodiments, in item 222 the methods herein can automatically begin scanning using the scanning component of the MFP based just (only) on the document-presence sensor detecting a document being present and the scan-readable code being read from the job identification sheet. In other embodiments, such as a print job, as soon as the scan-readable code is read in item 220 the printing commences immediately and the print job is output to a location from which the user may retrieve the print job without making physical contact with the MFP.

In other embodiments, these methods may first require that the user be identified and/or authenticated in item 220 before the automatic processing in item 222 can begin. Therefore, in addition to the scan-readable code that is read in item 220 above, the user may also be requested to provide authorization information in item 220 in the same manner discussed in greater detail above relating to item 120 in FIG. 1.

Again, any scanned or printed sheets that are output from the MFP to locations that permit the user to retrieve the sheets without making physical contact with the MFP, in the manner discussed above. As shown in item 224 in FIG. 2 (which is discussed in greater detail above relating to item 124 in FIG. 1) the shared user interface of the MFP can display a message that the job has been completed and (if the sheets have not been removed from the appropriate trays, as determined by the sensors within those trays) messages that the user needs to remove their sheets from the trays. In addition, the user interface of the MFP can display messages that any areas where the user has made physical contact need to be wiped down and cleaned prior to the next user's arrival. The user then walks away from the MFP (physically leaves the MFP) as shown in item 226 in FIG. 2.

Additional optional processing is shown in items 228-232 (again indicated in FIG. 2 using dashed line boxes). In item 228 (which is discussed in greater detail above relating to item 128 in FIG. 1) the MFP determines whether any users are present within a specified physical distance range. This allows the MFP to determine its availability to perform the next job, as shown in item 230. Therefore, in item 230 (which is discussed in greater detail above relating to item 130 in FIG. 1) the MFP determines whether the previous job has been completed, whether the previous user has removed all papers from all trays, and whether all individuals have vacated the specific physical proximity distance range around the MFP. Once the MFP determines that it is available to perform the next job, the MFP can transmit an available status to the next app that was used to create the next job that the MFP will perform in item 232.

This processing allows such methods to automatically perform the job using the publicly shared machine based on the non-contact user identification component(s) identifying the job and/or user. Specifically, the publicly shared machine automatically performs the job based just (only) on the non-contact user identification component identifying the job and/or user (or possibly just upon the document handler detecting sheets being placed into the document handler) without requiring additional user interaction with the publicly shared machine. This minimizes or eliminates physical interaction of the user with the publicly shared machine.

FIGS. 3 and 4 illustrate screenshots 300, 400 of menus that can be presented by the app on the display of the user interface of the remote computerized device. More specifically, FIG. 3 illustrates a menu 300 that allows the user to select among various processing options for the publicly shared machine including: "touch-less hold-scan" (302) that allows the user to safely scan sheets with a minimal device interaction; a "scan" option (304) that allows a user to scan images from the publicly shared machine; a print option (306) that allows the user to print an item from the publicly shared machine; a device option (308) that allows settings to be managed; a scan receipts option (310) that allows the publicly shared machine to automatically scan multiple originals from the platen; and a document scanning option (312) that allows the publicly shared machine to scan and distribute a document.

FIG. 4 illustrates a menu 400 that allows the user to select among various processing options for the publicly shared machine including: a workflow option (402) that allows the user to preview images after scanning such images; a one-sided scan option (404) that allows a user to perform single-sided (simplex) scanning; a color option (406) that allows the user to choose, for example, automatic color detection or to set color options; an auto crop/straighten option (408) that sets whether automatic cropping and automatic straightening features are turned on or off; a build job option (410) that allows the publicly shared machine to automatically build a job when this option is turned on; and an original size option (412) that allows the publicly shared machine to automatically detect the size of the document.

While FIGS. 3 and 4 illustrate some examples of the menus that can be presented by the app on the remote computerized device, those ordinarily skilled in the art would understand that many other menus could be presented on the remote computerized device user interface by the app depending upon specific implementation. For example, some menus can allow the user to select facsimile (fax) options including options of scanning resolution, fax recipient list, fax cover page options, etc. Additional menus can include menu options that allow the user to identify a file to be printed by the publicly shared machine and its network server storage location. Further menu options that could be presented on the remote computerized device user interface by the app can include printing menu options that allow paper size selection, simplex/duplex selection, color/monochrome selection, collation options selection, finishing options selection, etc. Those ordinarily skilled in the art would understand that these exemplary menus in FIGS. 3 and 4 are only a small fraction of the menus that could be presented on the user interface of the remote computerized device by the app and that the app has the ability to present all menus that are available on the user interface of any type of publicly shared machine. While some menus can be automatically formatted to accommodate for different screen capabilities of the different user interfaces, all content from menus of the publicly shared machine can be presented on the user interface of the remote computerized device by the app.

Figure 5:
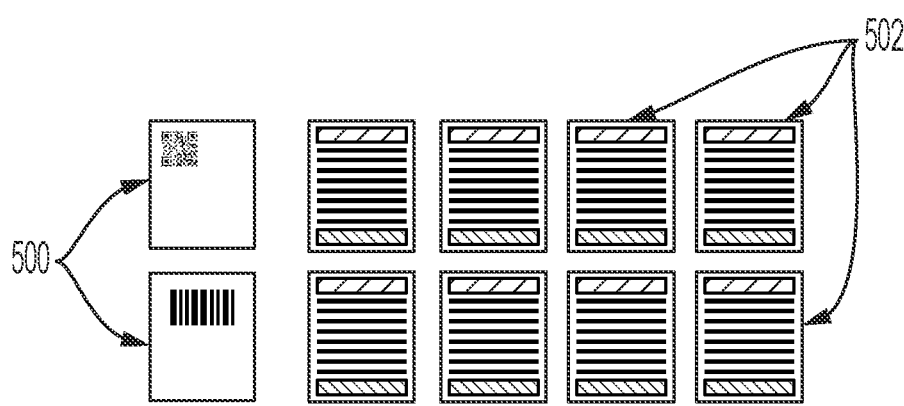
FIG. 5 is a schematic diagram illustrating uses of job identification sheets herein.

FIG. 5 illustrates job identification sheets 500, each of which can be located as the top sheet have an underlying stack of sheets 502. FIG. 5 illustrates that the job identification sheets 500 can include, for example, a QR code, a barcode, any other scan-readable code, etc.

Figure 6:
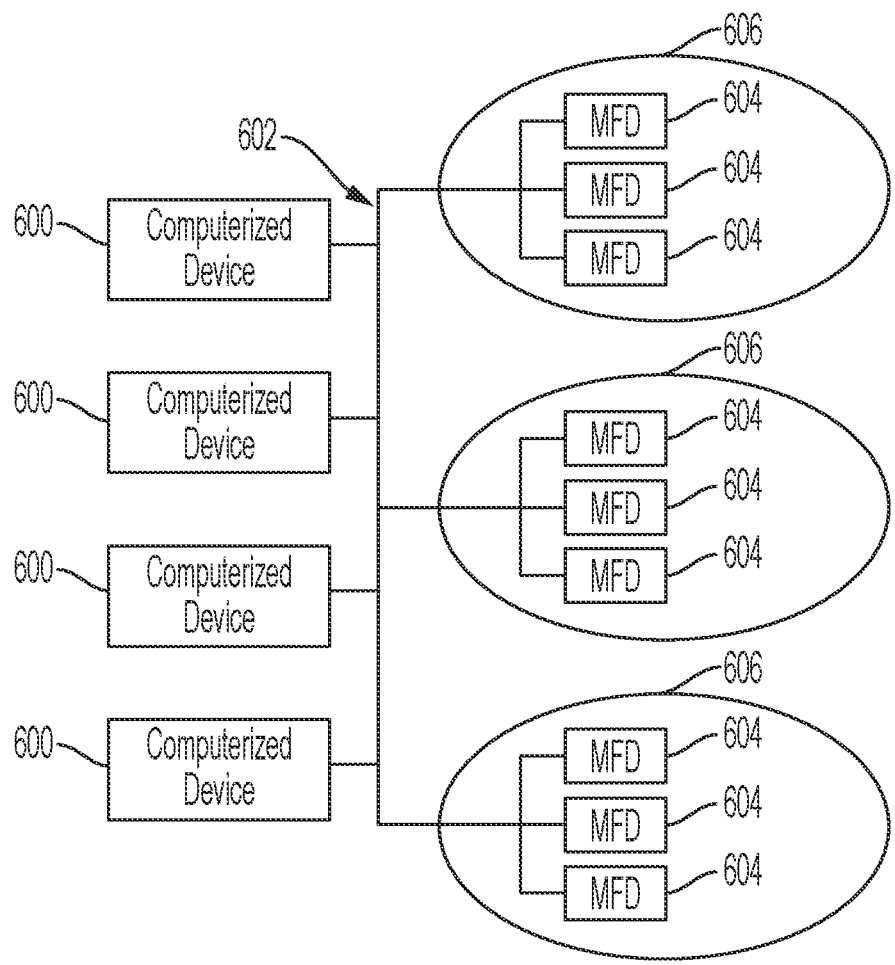
FIG. 6 is a schematic diagram illustrating systems herein.

As shown in FIG. 6, exemplary systems and methods herein include various computerized devices 600, 604 located at various different physical locations 606. The computerized devices 600, 604 can include print servers, printing components, personal computers, etc., and are in communication (operatively connected to one another) by way of a local or wide area (wired or wireless) network 602.

Figure 7:
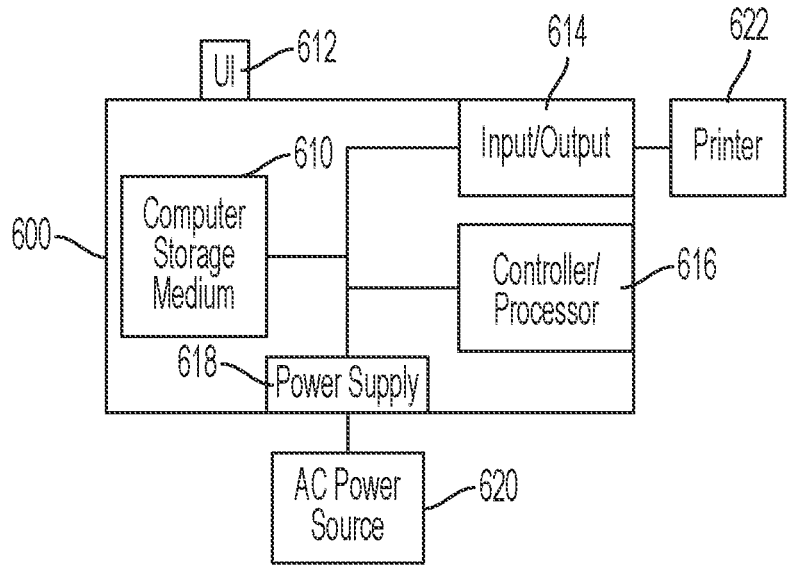
FIG. 7 is a schematic diagram illustrating computerized devices herein.

FIG. 7 illustrates a computerized device 600, which can be used with systems and methods herein and can comprise, for example, a print server, a personal computer, a portable computing device, etc. The computerized device 600 includes a controller/tangible processor 616 and a communications port (input/output) 614 operatively connected to the tangible processor 616 and to the computerized network 602 external to the computerized device 600. Also, the computerized device 600 can include at least one accessory functional component, such as a user interface (UI) assembly 612. The user may receive messages, instructions, and menu options from, and enter instructions through, the user interface or control panel 612.

The input/output device 614 is used for communications to and from the computerized device 600 and comprises a wired device or wireless device (of any form, whether currently known or developed in the future). The tangible processor 616 controls the various actions of the computerized device. A non-transitory, tangible, computer storage medium device 610 (which can be optical, magnetic, capacitor based, etc., and is different from a transitory signal) is readable by the tangible processor 616 and stores instructions that the tangible processor 616 executes to allow the computerized device to perform its various functions, such as those described herein. Thus, as shown in FIG. 7, a body housing has one or more functional components that operate on power supplied from an alternating current (AC) source 620 by the power supply 618. The power supply 618 can comprise a common power conversion unit, power storage element (e.g., a battery, etc.), etc.

Figure 8:
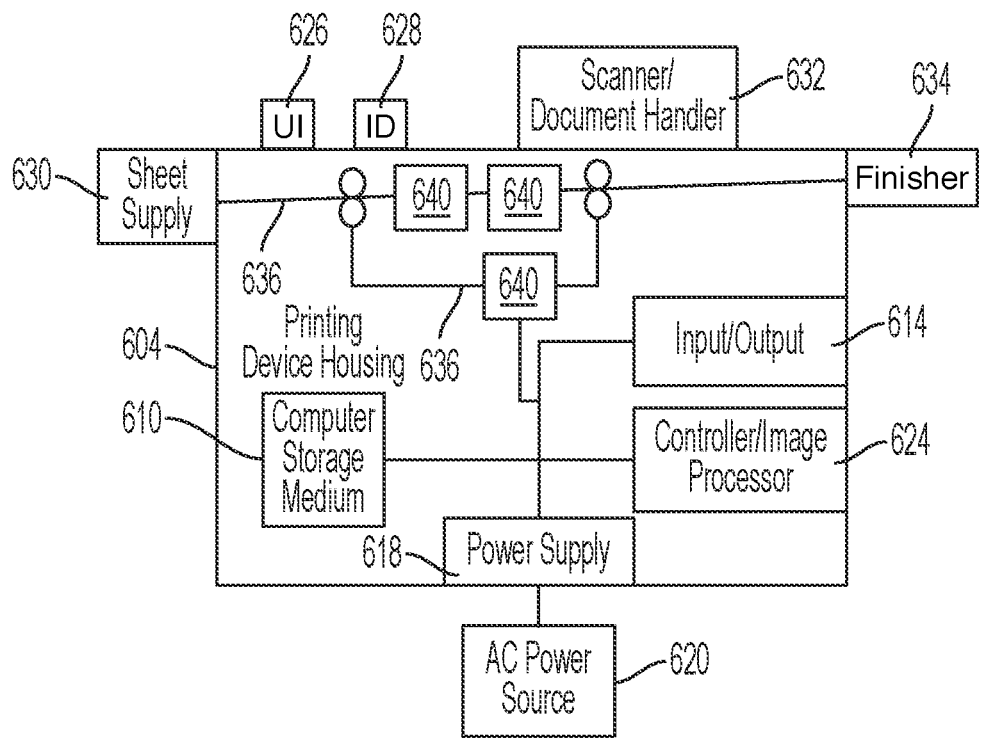
FIG. 8 is a schematic diagram illustrating printing components herein.

FIG. 8 illustrates a computerized device that is a printing device 604, which can be used with systems and methods herein and can comprise, for example, a printer, copier, multi-function publicly shared machine, multi-function device (MFD), etc. The printing device 604 includes many of the components mentioned above and at least one marking device (printing engine(s)) 640 operatively connected to a specialized image processor 624 (that may differ from a general-purpose computer because it is specialized for processing image data), a media path 636 positioned to supply continuous media or sheets of media from a sheet supply 630 to the marking device(s) 640, etc. After receiving various markings from the printing engine(s) 640, the sheets of media can optionally pass to a finisher 634 which can fold, staple, sort, etc., the various printed sheets. Also, the printing device 604 can include at least one accessory functional component (such as a scanner/document handler 632 (automatic document feeder (ADF)), etc.) that also operate on the power supplied from the external power source 620 (through the power supply 618).

The one or more printing engines 640 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

In one example, one of the computerized devices 600 may be what is referred to above as the remote computerized device and one of the printing devices 604 may be what is referred to above as the publicly shared machine. Therefore, in this example, systems herein generally can include a publicly shared machine 604 connected to a computerized network 602, as shown in FIG. 6. The publicly shared machine 604 can be, for example, an MFP that includes (among other components) a printing component 640, a scanning component 632, one or more non-contact user identification component(s) 628, etc., as shown in FIG. 8. Further, with systems herein an application (app) operates through or on the remote computerized device 600 that is also connected to the computerized network 602 as shown in FIG. 6. The app is, therefore, in communication with the publicly shared machine 604 through the computerized network 602.

The app is adapted to provide a menu of processing options designed to appear on the user interface 626 of the publicly shared machine 604 (e.g., FIGS. 3 and 4) to a user through a user interface 612 of the remote computerized device 600 as shown in FIG. 7. After receiving user input (feature selections) into the app through the user interface 612 of the remote computerized device 600, the app creates a job from the options selected from the menu, and the app transmits the job it created to the publicly shared machine 604 through the computerized network 602, as described above. The non-contact user identification component(s) 628 of the publicly shared machine 604 is/are adapted to identify the user, as also described above.

The publicly shared machine 604 is then adapted to automatically perform the job for the user, potentially based on the non-contact user identification component 628 identifying the user or based on the user supplying the job information sheet with the scan-readable code thereon (as discussed above). Specifically, the publicly shared machine 604 automatically performs the job based just (only) on the non-contact user identification component 628 identifying the user or by scanning information (e.g., a scan-readable code) printed on a document, as described above, without requiring additional user interaction with the publicly shared machine 604, as described above.

In various embodiments herein, the non-contact user identification 628 device can actually be multiple different identification components (e.g., a wireless electronic reader, an optical code reader, a facial recognition device, a voice recognition device, etc.) each performing user identification in a different manner. In such situations, the menu includes options for choosing one or more of these multiple identification components 628 and the app is adapted to add the chosen ones of the multiple identification components 628 to the job. In these embodiments, the publicly shared machine 604 is adapted to identify the user using just (only) the one or more chosen multiple identification components 628 that are included in the job. In this way, the user can adjust the processing to the degree of physical contact (or complete lack thereof) to match the level of hygienic safety the user desires.

The scanning component/document handler 632 can include a document-presence sensor, and the scanning component/document handler 632 can be adapted to automatically begin scanning based only on the document-presence sensor detecting a document being present. Further, the non-contact user identification component 628 can actually be the scanning component/document handler 632, and the scanning component 632 is adapted to identify the user and/or job by scanning information (e.g., a scan-readable code) printed on a document, as described above.

In other embodiments, the system may only optionally include the non-contact user identification component(s) 628. In such systems, the app is adapted to cause a scan-readable code containing the options selected in the job to be printed on a job identification sheet 500 (FIG. 5) as described above. In some examples, the remote computerized device 600 can be operatively (directly or indirectly) connected to a remote printer 622 that is separate from the publicly shared machine 604 as shown in FIG. 7. The app is adapted to cause the remote printer 622 to print the scan-readable code (e.g., the job) on a job identification sheet 500.

In other examples, the app is adapted to cause the printing component 640 to print the scan-readable code on the job identification sheet 500. Therefore, the user can carry a printed job identification sheet 500 containing the scan-readable code to the publicly shared machine 604, or the user can simply pick up the same printed job identification sheet 500 from the publicly shared machine 604. The user then places the job identification sheet 500 containing the scan-readable code on top of the stack of sheets to be scanned and drops the stack into the document handler 632 (all potentially without making contact with the publicly shared machine 604).

In these embodiments the scanning component/document handler 632 is actually the element that the app/system uses as the non-contact user identification component 628 and the scanning component/document handler 632 is adapted to scan the job identification sheet 500 and identify the options selected (from the scan-readable code (e.g., job) printed on the job identification sheet 500). The publicly shared machine 604 is adapted to automatically perform the job based on the scanning component/document handler 632 scanning the job identification sheet 500 using the options selected as identified by the scanning component 632. Specifically, the publicly shared machine 604 automatically performs the job based just (only) on the scanning component/document handler 632 scanning the job identification sheet 500, without requiring additional user interaction with the publicly shared machine 604.

These embodiments can also use the non-contact user identification component 628 where the non-contact user identification component 628 is adapted to identify the user that is associated with the job, and the publicly shared machine 604 is adapted to cause the printing component 640 to print the scan-readable code on a job identification sheet 500 based on the non-contact user identification component 628 identifying the user.

The above discussion notes that the systems herein are easy to implement because these systems do not require the incorporation of additional hardware components. Further, the flexibility of implementing some or all of the multiple features described above helps by avoiding mandating the addition of new components to existing equipment. The following examples describe some situations that benefit greatly from such systems.

In one example, the process of identifying the user is tailored based upon the complexity/capabilities of the existing equipment. For example, if a legacy MFP does not include wireless connection capabilities or other non-contact ways to identify the job or user, the systems herein must rely upon adapting the legacy MFP to begin scanning automatically when sheets are placed in the document handler and sensed by an existing document presence sensor. Thus, with this type of adaptation, the system is customized so that the app and system only utilize job information sheets supplied to the scanner component or only utilize processes that reserve the MFP for a single user. With this type of legacy MFP adaptation, all other possible modes of operation discussed above are suppressed because job information sheet and user reservation operations both function properly merely by depositing sheets within the document handler. In contrast, more advanced MFP devices may include RFID or NFC components, cameras, etc., and the systems herein are customized to provide the user with as many options as the existing components of the MFP will permit.

Additionally, the systems and methods herein perform user training and user behavior modification in a number of unique ways. In one way, the app presents various messages on the user interface of the remote computerized device to explain (using words and graphics or images) how users can deposit and retrieve sheets without making contact with the input and output trays of the MFP.

Further, when walk-up users immediately begin interacting with the user interface of the publicly shared machine, warning sounds/lights can produce alarms and messages can be displayed on the user interface of the publicly shared machine in order to instruct the user to only interact with the publicly shared machine through the app. This is especially useful in situations where a broad base of non-trained users commonly interact with the publicly shared machine, such as in the retail environment where the public is accustomed to walking up to the publicly shared machine to begin interactions physically with the user interface of the publicly shared machine.

In such situations, the non-trained user can be instructed (through messages appearing on the user interface of the publicly shared machine): how to download and install the app on there smartphone (remote computerized device); how to interact with the menu of the publicly shared machine through the app; how to physically interact in a non-contact manner with the publicly shared machine; how to maintain proper physical distance from other users and from the publicly shared machine while they await the availability of the publicly shared machine to perform their job; etc. Therefore, the systems and methods herein not only promote (or in some situation to require) non-contact interaction with the publicly shared machine, but the systems and methods herein also promote physical separation of users who would otherwise customarily gather around the publicly shared machine or form in a queue or line in front of the publicly shared machine. In these ways, the systems and methods help comply with every evolving health and safety guidelines as conditions and norms in society evolve.

For convenience of discussion, some of the previous sections of this disclosure are couched using examples surrounding printing devices; however, the embodiments herein are broadly applicable to many types of devices with which users commonly interact including, but not limited to, vending machines, entry systems, parking machines, ticketing kiosks, as well as all similar types of machines that interact with the public in public settings.

Figure 9:
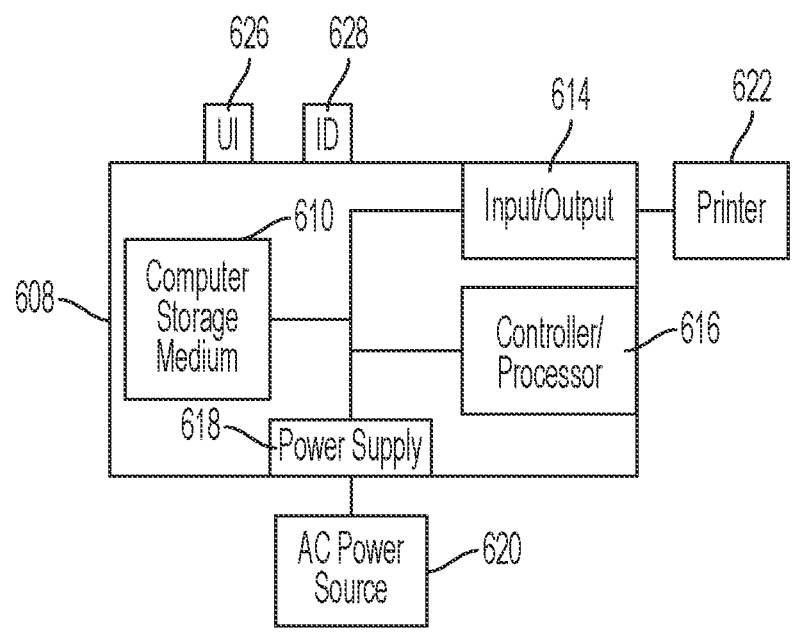
FIG. 9 is a schematic diagram illustrating generic publicly shared machines used by systems herein.

All these types of machines are intended to be represented by the generic publicly shared machine 608 shown in FIG. 9. In greater detail, FIG. 9 illustrates that the publicly shared machine 608 includes many of the components discussed above including a user interface 626, non-contact user identification components 628, computer storage 610, power supply 618 connected to a power source 620, input output 614 connected to a printer 622, controller/processors 616, etc., and can include many other components as necessary.

In one example the generic publicly shared machine 608 can be a vending machine that dispenses food, drink, novelties, other products, etc. Such existing devices are usually not highly sophisticated, but commonly include connections to computerized networks and include scanners for scanning barcodes from coupons or other redemption tickets, such as QR codes. Again, the flexibility of the app and systems herein allow for adaptation to such unsophisticated equipment. Specifically, the app is adapted to reproduce the very limited menu (which commonly only includes selection buttons and payment options on vending machines) on the user interface of the user's smartphone (remote computerized device). In such examples, the app is configured to prepare the job to include the user selection of the item desired from the vending machine and to complete payment for that item.

The app can be configured to send the job (containing item identification and payment confirmation) to the vending machine/generic publicly shared machine 608 and to cause the vending machine 608 to immediately dispensed the purchased item, without requiring any other action of the user (and removing all physical contact between the user and the vending machine 608). In other alternatives, the app is configured to display (on the user interface of the remote computerized device) a scan-readable code that is readable by the code reader 628 of the vending machine, if it is so equipped. The vending machine is adapted (without requiring new hardware that is different from the existing hardware of the vending machine) to read and understand the scan readable code. Thus, in systems herein the vending machine is adapted to dispense the purchased items specified in the job immediately/automatically upon receiving the job through the computerized network or immediately/automatically upon reading the job (scan readable code) presented on the user interface of the remote computerized device.

In another example, the generic publicly shared machine 608 can be a ticket dispenser for producing valid parking tickets users place on the dashboard of their cars when parking in pay parking areas or for producing tickets to movies, concerts, etc. Again, such existing devices are somewhat unsophisticated but commonly include rudimentary printers and scanners that can read bar codes, QR codes, etc.

In a similar manner to the adaptation of the systems and methods herein for use with vending machines, when being adapted for use with ticket dispensing machines versions of the generic publicly shared machine 608 the app presents a very limited menu that is available on the ticket dispenser 608 which may be limited to payment options, parking durations, show selections, etc.

The app can be configured to send the job (containing parking durations, show selections, and payment confirmation) to the ticket dispenser/generic publicly shared machine 608 and to cause the printer 622 of the ticket dispenser 608 to immediately print the purchased ticket, without requiring any other action of the user (and removing all physical contact between the user and the vending machine 608). In other alternatives, the app is configured to display (on the user interface of the remote computerized device) or cause the printer 622 of the ticket dispenser 608 to print a scan-readable code that is readable by the code reader 628 of the ticket dispenser 608, if it is so equipped. The ticket dispenser 608 is adapted (without requiring new hardware that is different from the existing hardware of the ticket dispenser 608) to read and understand the scan readable code. Thus, in systems herein the ticket dispenser 608 is adapted to print the purchased ticket specified in the job immediately/automatically upon receiving the job through the computerized network or immediately/automatically upon reading the job (scan readable code) presented.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing component as used herein encompasses any apparatus, such as a digital copier, bookmaking publicly shared machine, facsimile publicly shared machine, multi-function publicly shared machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic publicly shared machines and/or processes.

Terms such as "touching", "on", "in direct contact", "abutting", "directly adjacent to", etc., mean that at least one element physically contacts another element (without other elements separating the described elements). Further, the terms automated or automatically mean that once a process is started (by a publicly shared machine or a user), one or more publicly shared machines perform the process without further input from any user. Additionally, terms such as "adapted to" or "configured to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
  a publicly shared machine connected to a computerized network, wherein the publicly shared machine includes a printing component, a scanning component, and a non-contact user identification component; and
  an application (app) operating through a remote computerized device connected to the computerized network,
  wherein the app is in communication with the publicly shared machine through the computerized network,
  wherein the app is adapted to provide a menu of processing options of the publicly shared machine to a user on a user interface of the remote computerized device,
  wherein the app is adapted to create a job from options selected from the menu,
  wherein the app is adapted to transmit the job to the publicly shared machine through the computerized network,
  wherein the non-contact user identification component is adapted to identify the user present at the publicly shared machine, and
  wherein the publicly shared machine is adapted to automatically perform the job for the user based on the non-contact user identification component identifying the user.

2. The system of claim 1, wherein the publicly shared machine automatically performs the job based only on the non-contact user identification component identifying the user, without requiring additional user interaction with the publicly shared machine.

3. The system of claim 1, wherein the non-contact user identification component comprises multiple identification components, each performing user identification in a different manner,
  wherein the menu includes options for choosing one or more of the multiple identification components,
  wherein the app is adapted to add the one or more chosen ones of the multiple identification components to the job, and
  wherein the publicly shared machine is adapted to identify the user using only the one or more chosen ones of the multiple identification components included in the job.

4. The system of claim 3, wherein the multiple identification components comprise one or more of: a wireless electronic reader; an optical code reader; a facial recognition device; and a voice recognition device.

5. The system of claim 1, wherein the scanning component comprises a document-presence sensor, and wherein the scanning component is adapted to automatically begin scanning based only on the document-presence sensor detecting a document being present.

6. The system of claim 1, wherein the non-contact user identification component comprises the scanning component, and wherein the scanning component is adapted to identify the user by scanning information from a document.

7. The system of claim 6, wherein the information from the document comprises a scan-readable code printed on the document.

8. A system comprising:
  a publicly shared machine connected to a computerized network, wherein the publicly shared machine includes a printing component and a scanning component; and
  an application (app) operating through a remote computerized device connected to the computerized network,
  wherein the app is in communication with the publicly shared machine through the computerized network,
  wherein the app is adapted to provide a menu of processing options of the publicly shared machine on a user interface of the remote computerized device,
  wherein the app is adapted to create a job from options selected from the menu, wherein the app is adapted to cause a scan-readable code containing the options selected in the job to be printed on a job identification sheet, wherein the scanning component is adapted to scan the job identification sheet and identify the options selected from the scan-readable code on the job identification sheet, and wherein the publicly shared machine is adapted to automatically perform the job based on the scanning component scanning the job identification sheet using the options selected as identified by the scanning component.

9. The system of claim 8, wherein the publicly shared machine automatically performs the job based only on the scanning component scanning the job identification sheet, without requiring additional user interaction with the publicly shared machine.

10. The system of claim 8, wherein the remote computerized device is operatively connected to a remote printer separate from the publicly shared machine, and wherein the app is adapted to cause the remote printer to print the scan-readable code on the job identification sheet.

11. The system of claim 8, wherein the app is adapted to cause the printing component to print the scan-readable code on the job identification sheet.

12. The system of claim 11, wherein the publicly shared machine further comprises a non-contact user identification component, wherein the non-contact user identification component is adapted to identify a user associated with the job being present at the publicly shared machine, and wherein the publicly shared machine is adapted to cause the printing component to print the scan-readable code on the job identification sheet based on the non-contact user identification component identifying the user.

13. The system of claim 12, wherein the non-contact user identification component comprises one or more of: a wireless electronic reader; an optical code reader; a facial recognition device; and a voice recognition device.

14. The system of claim 8, wherein the scanning component further comprises a document-presence sensor, and wherein the scanning component is adapted to automatically scan the job identification sheet and the publicly shared machine automatically performs the job based only on the document-presence sensor detecting the job identification sheet being present.

15. A method comprising:
providing a menu of processing options of a publicly shared machine on a user interface of a remote computerized device using an application (app) operating through the remote computerized device, wherein the publicly shared machine is connected to the remote computerized device through a computerized network, wherein the app is in communication with the publicly shared machine through the computerized network, and wherein the publicly shared machine includes a printing component, a scanning component, and a non-contact user identification component;

creating a job from options selected from the menu using the app;

transmitting the job from the app to the publicly shared machine through the computerized network;

notifying, by the publicly shared machine, the app that the publicly shared machine is available to perform the job through the computerized network;

providing a notice on the user interface of the remote computerized device that the publicly shared machine is available to perform the job using the app;

identifying a user present at the publicly shared machine using the non-contact user identification component; and automatically performing the job using the publicly shared machine based on the non-contact user identification component identifying the user.

16. The method of claim 15, wherein the publicly shared machine automatically performs the job based only on the non-contact user identification component identifying the user, without requiring additional user interaction with the publicly shared machine.

17. The method of claim 15, wherein the non-contact user identification component comprises multiple identification components, each performing user identification in a different manner, wherein the menu includes options for choosing one or more of the multiple identification components, wherein the method further comprises adding one or more chosen ones of the multiple identification components to the job using the app, and wherein the identifying the user is performed using only the one or more chosen ones of the multiple identification components included in the job by the publicly shared machine.

18. The method of claim 17, wherein the multiple identification components comprise one or more of: a wireless electronic reader; an optical code reader; a facial recognition device; and a voice recognition device.

19. The method of claim 15, wherein the scanning component comprises a document-presence sensor, and wherein the method further comprises automatically beginning scanning using the scanning component based only on the document-presence sensor detecting a document being present.

20. The method of claim 15, wherein the non-contact user identification component comprises the scanning component, and wherein the identifying the user is performed using the scanning component by scanning a scan-readable code from a document.

* * * * *